United States Patent [19]

Gamble et al.

[11] 4,397,102

[45] Aug. 9, 1983

[54] FLUIDIZED BED HEAT EXCHANGER INCORPORATING INDUCED CIRCULATION UTILIZING DIRECTIONAL AND/OR DIFFERENTIAL BED FLUIDIZATION

[76] Inventors: Robert L. Gamble, 27 Yellowbrick Rd., Wayne, N.J. 07470; Robert D. Stewart, 38 Brookside Terrace, Verona, N.J. 07044

[21] Appl. No.: 317,979

[22] Filed: Nov. 3, 1981

[51] Int. Cl.³ .............................................. F26B 17/10

[52] U.S. Cl. .................................. 34/57 A; 34/57 B; 432/58

[58] Field of Search ....................... 122/4 D; 110/245; 34/57 A, 57 B, 10; 432/15, 58

[56] References Cited

U.S. PATENT DOCUMENTS 2,975,037 3/1961 Lake .................................... 23/288

3,463,617 8/1969 Takeuchi .............................. 23/284

4,035,152 7/1977 Yang et al. ............................ 23/284

4,335,661 6/1982 Stewart et al. ...................... 110/245

FOREIGN PATENT DOCUMENTS 53-118870 10/1978 Japan .

*Primary Examiner*—Larry I. Schwartz

[57] ABSTRACT

A fluidized bed heat exchanger in which a perforated plate is disposed within a housing for supporting a bed of particulate material which is introduced into the housing through an inlet. Air is passed through the plate to fluidize the particulate material and a drain pipe is provided for discharging the spent material from the bed. A plurality of nozzles are provided in association with the perforations in the plate for directing air toward the drain pipe to promote the circulation of the bed materials from the inlet to the drain pipe.

8 Claims, 4 Drawing Figures

10 20 18 16 2 32 18 20 12 38 22 34a 34 2 36 36 42 24 40 40 28 30 26

10
18
20
16
20
36
12
14
32
34
36
18
20
18
18
20
17

10
16
32
32
50a
12
14
32
32
17

10
18
20
4
4
32
32
20
18
12
22
38
36
50a
50a
36
42
40
24
40
50
30

FLUIDIZED BED HEAT EXCHANGER INCORPORATING INDUCED CIRCULATION UTILIZING DIRECTIONAL AND/OR DIFFERENTIAL BED FLUIDIZATION

BACKGROUND OF THE INVENTION

This invention relates to a fluidized bed heat exchanger and, more particularly, to a heat exchanger in which heat is generated by the combustion of particulate fuel in a fluidized bed.

The use of fluidized beds has long been recognized as an attractive way of generating heat. In a normal fluidized bed arrangement, air is passed through a perforated plate, or grid, which supports a bed of particulate material, usually including a mixture of fuel material, such as high sulfur bituminous coal, and an adsorbent material for the sulfur released as a result of the combustion of the coal. As a result of the air passing through the bed, the bed behaves like a boiling liquid which promotes the combustion of the fuel. In addition to enjoying a capability for considerably reducing the amount of sulfur-containing gases introduced to the atmosphere, such an arrangement permits relatively high heat transfer rates, substantially uniform bed temperatures, combustion at relatively low temperatures, a reduction in corrosion and boiler fouling and a reduction in boiler size.

In the fluidized bed combustion process, the coal and adsorbent are continuously introduced into the bed by suitable feeders, injectors, or the like and the spent coal and adsorbent are discharged from the lower portion of the bed, usually through a gravity drain pipe extending through a wall of the heat exchanger or through a discharge opening formed through the perforated support plate. However, in these type of arrangements, there is only a minimal number of feeders or injectors, which are usually mounted through the heat exchanger walls, which results in poor distribution and mixing of the particulate material in the bed and therefore an insufficient residence time and a reduced reaction efficiency. This problem is specially acute in connection with particulate coal of high reactivity, such as lignite, and/or relatively fine size particles (smaller than ⅛ inch), and/or low density particles, all of which require good mixing and distribution for maximum efficiency. Conversely, the feed of larger sized coal may leave larger sized ash particles which can be difficult to drain from the bed.

SUMMARY OF THE INVENTION

It is therefore an object of the present invention to provide a fluidized bed heat exchanger in which an improved mixing and distribution of the bed material in the bed is achieved in a relatively inexpensive and simple manner.

It is a further object of the present invention to provide a fluidized bed heat exchanger of the above type in which the bed material is circulated within the bed in a direction from the inlet to the drain in such a manner as to provide sufficient residence time so that larger particles can react in the bed and thus not pass through the drain.

It is a further object of the present invention to provide a fluidized bed heat exchanger of the above type in which circulation of the bed materials is induced by a plurality of fluidization nozzles with directional exhausts oriented to impart momentum to the bed materials to cause circulation in the desired direction and improved draining.

It is a further object of the present invention to provide a fluidized bed heat exchanger of the above type in which bed circulation is induced by varying the quantity of fluidizing gas in different areas or zones of the bed to cause higher and lower bed densities to exist in different zones of the bed, thereby inducing a desirable circulation of the bed material.

It is a still further object of the present invention to provide a fluidized bed heat exchanger of the above type in which a plurality of fluidization nozzles are provided which direct the fluidization air in a direction so that the particulate materials in the bed move in an irregular path which increases residence time of the larger particles which may otherwise tend to segregate and settle to the grid.

Toward the fulfillment of these and other objects, the heat exchanger of the present invention comprises a plurality of nozzles respectively associated with the perforations in a perforated plate which supports a bed of particulate material. The nozzles are oriented toward the bed drain to induce circulation of the bed material within the bed in a manner to insure an optimum distribution and mixing of the materials, as well as promote drainage of large size ash particles which may tend to segregate to the bottom of the bed.

DESCRIPTION OF THE DRAWINGS

The above brief description, as well as further objects, features and advantages of the present invention will be more fully appreciated by reference to the following detailed description of the presently preferred but nonetheless illustrative embodiment in accordance with the present invention when taken in conjunction with the accompanying drawings in which.

DESCRIPTION OF THE PREFERRED EMBODIMENT

Figure 1:
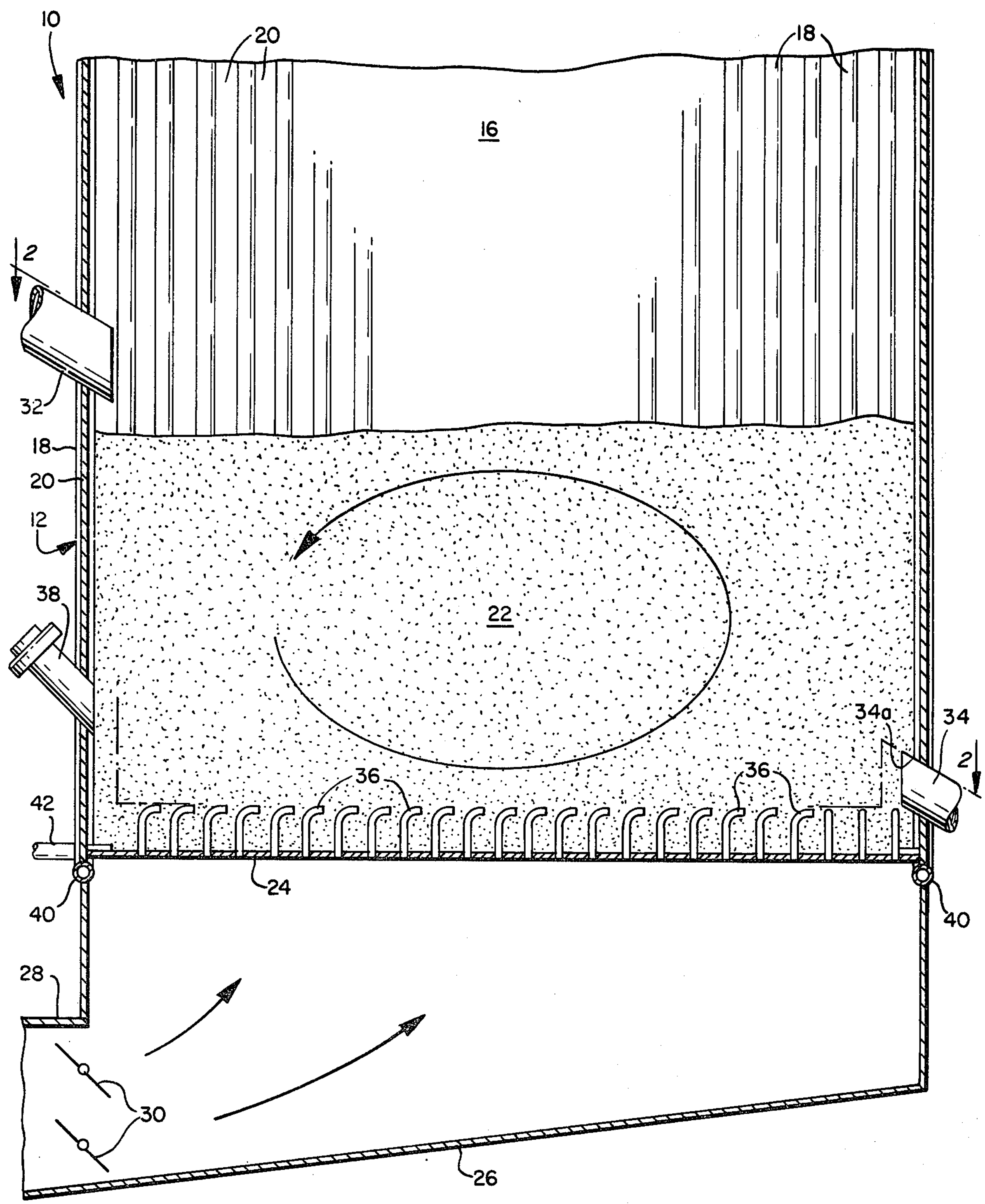
FIG. 1 is a vertical sectional view of an embodiment of the fluidized bed heat exchanger of the present invention.
Figure 2:
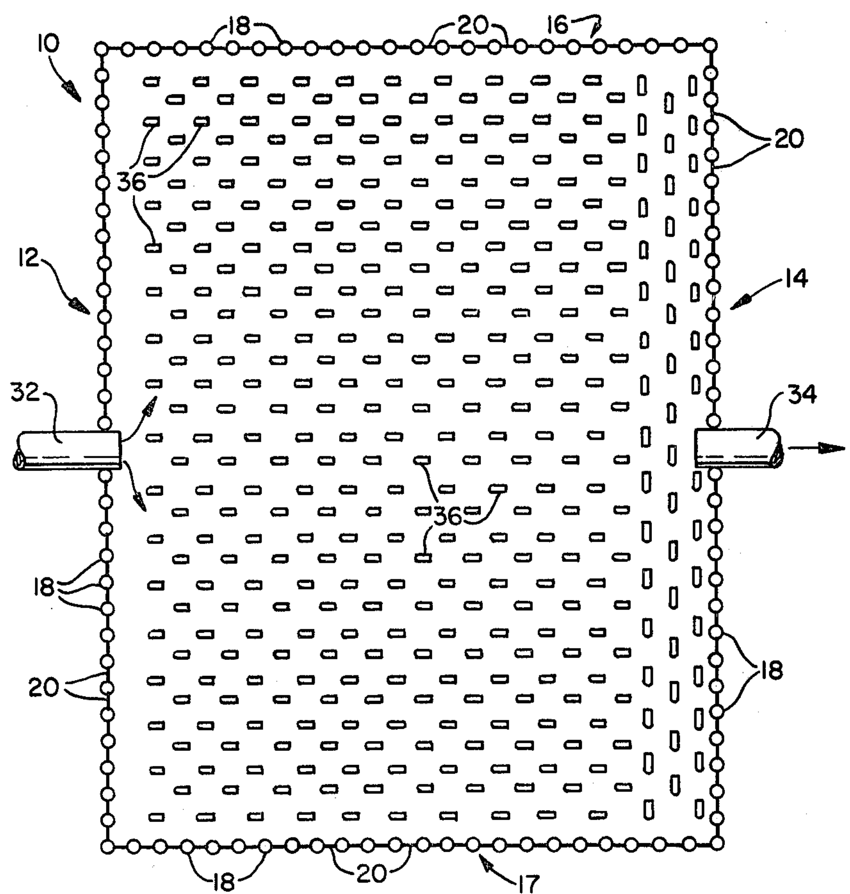
FIG. 2 is a reduced plan view depicting the heat exchanger of FIG. 1 with the bed material omitted in the interest of clarity.

Referring to FIGS. 1 and 2 of the drawings, the reference numeral 10 refers in general to an enclosure forming a major portion of a fluidized bed heat exchanger which may be in the form of a boiler, a combustor, a process reactor or any similar type device. The enclosure 10 consists of a front wall 12, a rear wall 14, and two sidewalls 16 and 17 respectively. According to the exemplary embodiment shown, each wall is formed by a plurality of vertically-extending tubes 18 disposed in a spaced, parallel relationship and connected together by a plurality of elongated fins 20 extending for the entire lengths of the tubes and connected to diametrically opposed surfaces of the tubes in a conventional manner. The upper portion of the enclosure 10 is not shown for the convenience of presentation, it being understood that it consists of a convection section, a roof and an outlet for allowing the combustion gases to discharge, also in a conventional manner.

A bed of particulate material, shown in general by the reference numeral 22 is disposed within the enclosure 10 and rests on a perforated plate 24 extending horizontally in the lower portion of the enclosure. The bed 22 can consist of a mixture of discrete particles of fuel material such as bituminous coal, and an adsorbent, such as limestone, for adsorbing the sulfur released by the combustion of the fuel material.

An air plenum 26 is provided immediately below the plate 24 and an inlet 28 is provided through the plenum for distributing pressurized air from an external source (not shown) to the plenum under the control of a pair of dampers 30.

An overbed feeder 32 extends through the front wall 12, receives particulate coal from inlet ducts or the like (not shown), and is adapted to feed the coal particles onto the upper surface of the bed 22. The feeder 32 can operate by gravity discharge or can be in the form of a spreader-type feeder or any other similar device. It is understood that a feeder can also be provided for discharging an adsorbent onto the bed 22, and would be constructed and arranged in a manner similar to the feeder 32.

A drain pipe 34 extends through the wall 14 and has an inlet end portion 34*a* that registers with the interior of the enclosure 10 in communication with the lower portion of the bed 22. The pipe 34 is thus adapted to receive the spent bed material and functions to discharge the material from the enclosure 10 by gravity to a screw cooler, conveyor belt, or the like (not shown).

A plurality of air distributors, or nozzles, 36 communicate with the perforations of the plate 24 and each nozzle includes a vertically disposed tubular member that is secured to the plate in any conventional manner, such as by bolting or welding. The vertical portions of the nozzles 36 extend upwardly from the plate 24 for a predetermined distance into the bed 22 and their lower ends receive air from the plenum 26. Each nozzle 36 is bent at approximately a ninety degree angle to form a horizontally extending portion which is oriented in a manner to be described in detail later. As a result of the foregoing, the air from the plenum 26 enters the vertical portions of the nozzles 26 and discharges from the horizontal portions into the bed 22. In addition, the pitch of or number of nozzles per unit of bed area can be varied to cause zones of different bed density to achieve a desirable circulation. Similarly, the nozzle type or size, at constant pitch, can be varied to vary the air or gas flow. Similarly, at constant pitch, air flow, regulated by external dampers and plenum division plate can be varied in different zones of the bed. Since the air ultimately rises by convection in the enclosure 10 and discharges, along with the gaseous products of combustion, from an outlet (not shown) in the upper portion of the enclosure, the bed material extending above the horizontal nozzle portions is fluidized. Also, a dormant layer of particulate material is formed around the vertical portions of the nozzles 36 which acts to insulate the plate 24 from the heat generated in the heat exchanger extending above the nozzles 36.

As shown in FIGS. 1 and 2, a large majority of the nozzles 36 are oriented so that their horizontal discharge portions are directed towards the drain pipe 34 in general, and toward the rear wall 14 in particular, while a portion of the nozzles 36 (two rows in the example shown) adjacent the wall 14 are oriented so that their horizontal portions extend perpendicular to the horizontal portions of the other nozzles and directly towards the drain pipe 34. As a result of this orientation, a momentum is imparted to the bed material which induces a circulation of the material in the direction indicated by dashed flow arrows in FIG. 1 to insure superior distribution, mixing and draining of the particulate material.

A bed light-off burner 38 is provided through the front wall 12 immediately above the plate 24 for initially lighting off the bed during startup in a conventional manner.

A pair of horizontal headers 40 are connected in fluid communication with the tubes 18 forming the front wall 12 and the rear wall 14, respectively, and another horizontal header 42 is connected in fluid communication with the tubes 18 forming the sidewalls 16. It is understood that headers similar to the headers 40 and 42 are provided in communication with both ends of the sidewall 17 and the upper ends of the walls 12, 14 and 16. As a result, a fluid to be heated can be sequentially or simultaneously passed through the walls 12, 14, 16 and 17 to pick up the heat from the fluidized bed in a conventional manner.

In operation, the dampers 30 associated with the air plenum 26 are opened and pressurized air passes up through the plenum and into the inlet ends of the nozzles 36. The air flows upwardly through the vertical portions of the nozzles 36 before passing through the horizontal portions and discharging into the bed 22 at a plane above the plane of the plate 24. The air then passes through the bed 22 in a generally upwardly direction towards the drain pipe 34. Thus, that portion of the particulate material in the bed 22 extending immediately above the nozzles 36 is fluidized in a manner to induce a circulation of the particulate material in the bed feeder 32 towards the drain pipe 34, while the portion extending between the latter ends and the upper surface of the plate 24 remains dormant, or stagnant.

The light-off burner 38 is then fired to heat the material in the bed until the temperature of the material reaches a predetermined level, and additional particulate fuel is discharged from the feeder 32 while adsorbent material is discharged onto the upper surface of the bed 22 as needed.

After the bed 22 has been fluidized and has reached a predetermined elevated temperature in accordance with the foregoing, the light-off burner 38 is turned off while the feeder 32 continues to distribute particulate fuel to the upper surface of the bed in accordance with predetermined feed rates. As a result of the foregoing, an improved mixing and distribution of the particulate material is achieved due to the momentum imparted to the bed material and the improved circulation of the latter within the bed. Also, the dormant layer of particulate material extending between the upper surface of the plate 24 and the horizontal portions of the nozzles 36 acts as an insulator for the plate 24.

Fluid, such as water, to be heated is passed into the headers 40 and 42 where it passes simultaneously, or in sequence, through the tubes 18 forming the walls 12, 14, 16 and 17 to add heat from the fluidized bed to the fluid before it is passed to external apparatus for further processing.

Figure 4:
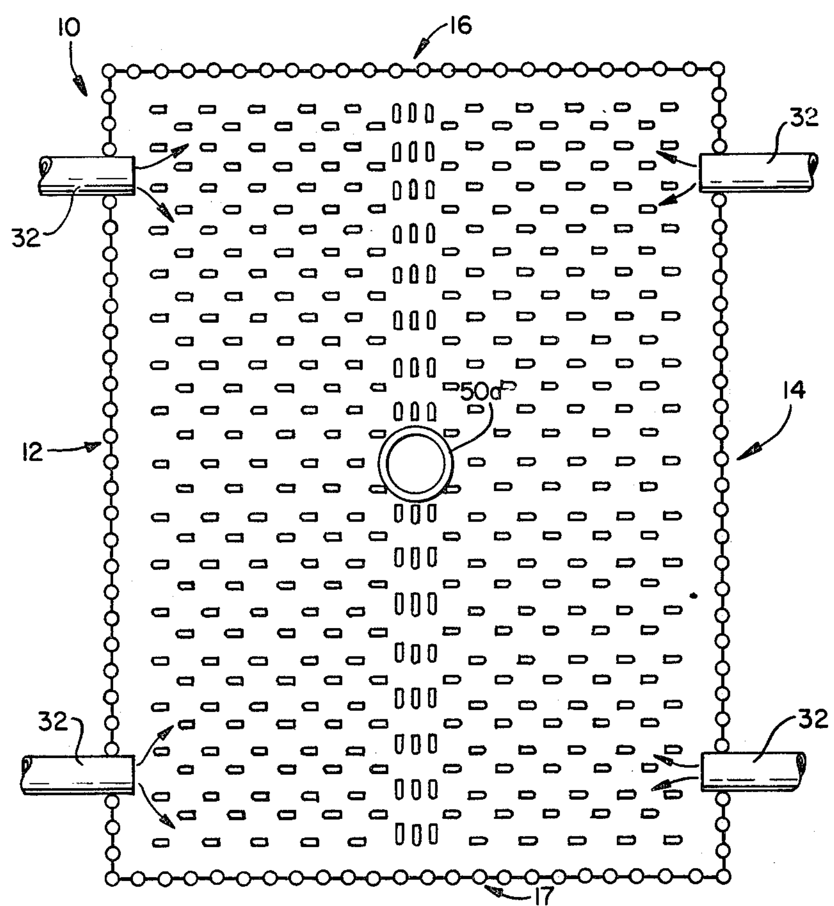
FIG. 4 is a view similar to FIG. 2, but depicting the heat exchanger of FIG. 3.
Figure 3:
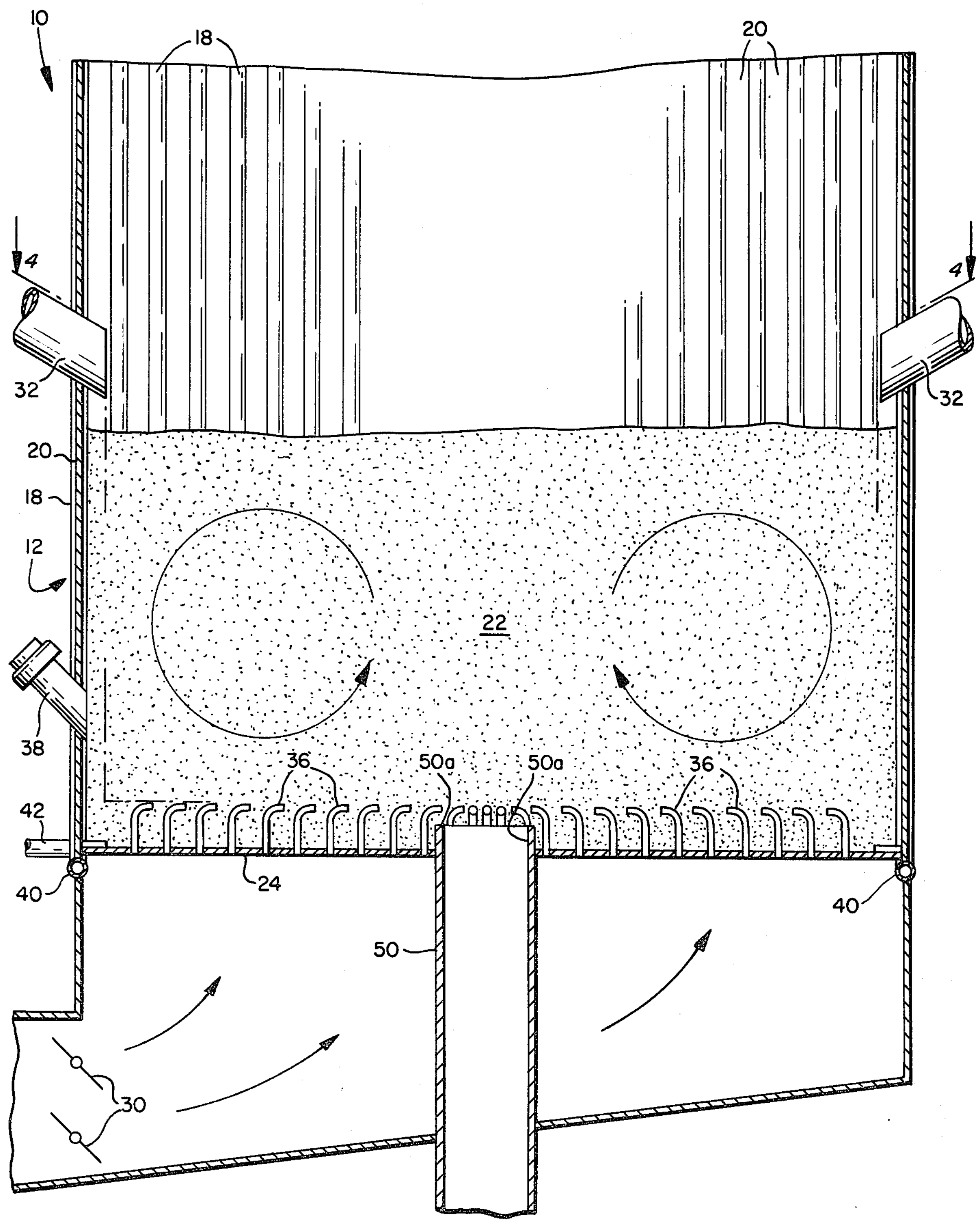
FIG. 3 is a view similar to FIG. 1 but depicting an alternate embodiment of the fluidized bed heat exchanger of the present invention.

The embodiment of FIGS. 3 and 4 is similar to that of the embodiment of FIGS. 1 and 2, and identical components have been given the same reference numerals. According to the embodiment of FIGS. 3 and 4, a centrally located drain pipe 50 extends through the air plenum 26 and has an inlet end portion 50*a* that extends through, and projects slightly upwardly from, an enlarged opening formed in the plate 24.

As can be better appreciated from FIG. 4, the drain pipe 50 is disposed midway between the walls 12 and 14 and midway between the walls 16 and 17, and thus in the central portion of the plate 24.

Four feeders 32 are provided for discharging coal particles onto the upper surface of the bed 22, with two feeders extending through the front wall 12 and two extending through the rear wall 14.

According to this embodiment, the nozzles 36, which are identical in construction to the nozzles of the previous embodiment, are oriented in a general direction towards the centrally located drain pipe 50. More particularly, the nozzles 36 extending between the front wall 12 and the drain pipe 36 are oriented to discharge the air in a general left-to-right direction as viewed in FIGS. 3 and 4 while the nozzles extending between the rear wall 14 and the drain pipe 50 are oriented to discharge the air in a general right-to-left direction. Also, a portion of the nozzles 36 extending in three rows and between the side wall 16 and the drain pipe 50 are oriented in a direction perpendicular to the remaining nozzles are directly towards the drain pipe. Similarly, the remaining nozzles in these three rows and disposed between the sidewall 17 and the drain pipe 50 are also oriented in a perpendicular direction and towards the drain pipe 50.

Therefore, according to this embodiment, an improved mixing and distribution of the particulate material is also achieved as a result of the momentum imparted to the material and the improved circulation of the material within the bed.

It is understood that the nozzles 36 can take a different configuration from that discussed above, and the number and specific locations of the nozzles and their specific orientation can be varied as long as the above objectives and results are achieved. For example, size, pitch, or direction of discharge of the nozzles 36 can be varied in different areas of the bed to cause varying densities in the different bed areas thereby inducing the improved circulation discussed above.

Still other variations in the invention may be made without departing from its scope. For example, a bank, or series, of heat exchange tubes can be provided in the enclosure 10 for circulating water in a heat exchange relationship with the bed 22 in a conventional manner.

A latitude of modification, change and substitution is intended in the foregoing disclosure and in some instances some features of the invention will be employed without a corresponding use of other features. According, it is appropriate that the appended claims be construed broadly and in a manner consistent with the spirit and scope of the invention therein.

What is claimed is:

1. A fluidized bed heat exchanger comprising a plate adapted to support a bed of particulate material, four upright walls extending around said plate to form an enclosure for said bed, inlet means extending through one of said walls for introducing additional particulate material to said bed, a plurality of nozzles supported by said plate and extending in said bed for receiving air and discharging said air in a first direction towards a wall opposite said one wall to fluidize said bed, drain means extending through said opposite wall and registering with said bed for discharging spent bed material, and an additional plurality of nozzles located adjacent said opposite wall and oriented to discharge said air in a direction perpendicular to said first direction and towards said drain means, whereby circulation of said bed material is induced from said inlet means to said drain means.

2. The heat exchanger of claim 1 wherein said nozzles are arranged in a first plurality of rows extending across the entire width of said plate and a second plurality of rows extending across the entire length of said plate.

3. The heat exchanger of claim 1 wherein said nozzles extend through corresponding openings in said plate, and wherein said air is introduced to said nozzles from an area below said plate.

4. The fluidized bed of claim 1 wherein each of said nozzles includes a vertical portion extending upwardly from said bed, the bed material extending around said vertical portions being dormant so as to insulate said plate from the heat in said bed.

5. The fluidized bed of claim 4 wherein said nozzles are adapted to discharge said air in a substantially horizontal direction.

6. A fluidized bed heat exchanger comprising a rectangular plate adapted to support a bed of particulate material, four upright walls extending around said plate to form an enclosure for said bed, inlet means extending through one of said walls for introducing additional particulate material to said bed, a plurality of nozzles supported by said plate and extending in said bed for discharging air into said bed to fluidized said bed, a first and second group of said nozzles respectively located on opposite sides of a plane extending midway between the ends of said plate and directed towards said plane, and a third and fourth group of said nozzles respectively located on opposite sides of a plane extending midway between the sides of said plate and directed towards said latter plane, drain means extending through and registering with said bed at the intersection of said planes for discharging spent bed material, whereby circulation of said bed material is induced from said inlet to said drain means.

7. The heat exchanger of claim 6 wherein said nozzles are arranged in a first plurality of rows extending across the entire width of said plate and a second plurality of rows extending across the entire length of said plate.

8. The heat exchanger of claim 6 wherein said nozzles extend through corresponding openings in said plate, and wherein said air is introduced to said nozzles from an area below said plate.

* * * * *